(12) United States Patent
Sung et al.

(10) Patent No.: US 7,483,632 B2
(45) Date of Patent: Jan. 27, 2009

(54) APPARATUS AND METHOD FOR SUPPORTING QUALITY OF SERVICE IN ETHERNET PASSIVE OPTICAL NETWORK SYSTEM

(75) Inventors: Jung Sik Sung, Daejeon (KR); Tae Il Kim, Daejeon (KR); Hyeong Ho Lee, Daejeon (KR); Jae Doo Huh, Daejeon (KR)

(73) Assignee: Electronics and Telecommunications Research Institute (KR)

( * ) Notice: Subject to any disclaimer, the term of this patent is extended or adjusted under 35 U.S.C. 154(b) by 818 days.

(21) Appl. No.: 10/910,757

(22) Filed: Aug. 2, 2004

(65) Prior Publication Data
US 2005/0074238 A1 Apr. 7, 2005

(30) Foreign Application Priority Data
Oct. 2, 2003 (KR) .................... 10-2003-0068609

(51) Int. Cl.
*H04B 10/20* (2006.01)
(52) U.S. Cl. ........................................ 398/63
(58) Field of Classification Search ............ 398/60, 398/63, 67
See application file for complete search history.

(56) References Cited

U.S. PATENT DOCUMENTS

| | | | |
|---|---|---|---|
| 6,154,776 A | | 11/2000 | Martin |
| 6,424,657 B1 | | 7/2002 | Voit et al. |
| 7,165,122 B1 * | | 1/2007 | Sitaraman et al. ........... 709/250 |
| 7,191,229 B2 * | | 3/2007 | Edmondson ................ 709/224 |
| 7,197,244 B2 * | | 3/2007 | Thomas et al. ................ 398/72 |
| 7,330,654 B2 * | | 2/2008 | Song et al. .................... 398/71 |
| 2002/0083175 A1 * | | 6/2002 | Afek et al. .................. 709/225 |
| 2003/0204632 A1 * | | 10/2003 | Willebeek-LeMair et al. .... 709/249 |
| 2005/0058135 A1 * | | 3/2005 | Sisto et al. ................ 370/395.2 |
| 2006/0013138 A1 * | | 1/2006 | Haran et al. ................. 370/236 |

FOREIGN PATENT DOCUMENTS

| KR | 1020020012645 A | 2/2002 |
|---|---|---|
| KR | 1020020045992 | 6/2002 |

OTHER PUBLICATIONS

"IPACT: A dynamic protocol for an ethernet pon (EPON)" by Glen Kramer, et al.; *IEEE Communications Magazine*, Feb. 2002; pp. 74-80.

(Continued)

*Primary Examiner*—Shi K Li
(74) *Attorney, Agent, or Firm*—Blakely, Sokoloff, Taylor & Zafman

(57) ABSTRACT

An apparatus and method for supporting quality of services (QoS) for respective subscriber classes for an Ethernet passive optical network (E-PON) are provided. The method for supporting QoS includes specifying bandwidths and subscriber classes for respective ports for a plurality of subscriber termination systems connected to a service provider termination system; based on the bandwidth information, allocating bandwidths for respective subscriber ports of the subscriber termination systems; based on the subscriber class information, assigning IP addresses to respective subscriber of the subscriber termination systems according to subscriber class; and by using the bandwidths and IP addresses, supporting QoS according to subscriber class in transmitting and receiving data between the service provider termination system and the subscriber termination systems.

22 Claims, 8 Drawing Sheets

OTHER PUBLICATIONS

*Korean Institute of Communication Sciences (KICS) Journal*, May 2003, vol. 28-5B; pp. 457-465.
"Cyclic Polling-Based Dynamic Bandwidth Allocation for Differentiated Classes of Service in Ethernet Passive Optical Networks", S. Choi, Jul. 31, 2003, vol. 28, No. 7B, pp. 620-627.
ETRI Weekly technology trend No. 918 of Korean Institute of Communication Sciences (issued Oct. 20, 1999).
Choi, Su-Il, "Cyclic Polling-Based Dynamic Bandwidth Allocation for Differentiated Classes of Service in Ethernet Passive Optical Networks," Korean Institute of Communication Sciences, No. 7B, vol. 28, Jul. 31, 2003, pp. 620-627.
Electronics and Telecommunications Research Institute weekly technology trend No. 918, Korean Institute of Communication Sciences, Oct. 20, 1999, pp. 1-14.

* cited by examiner

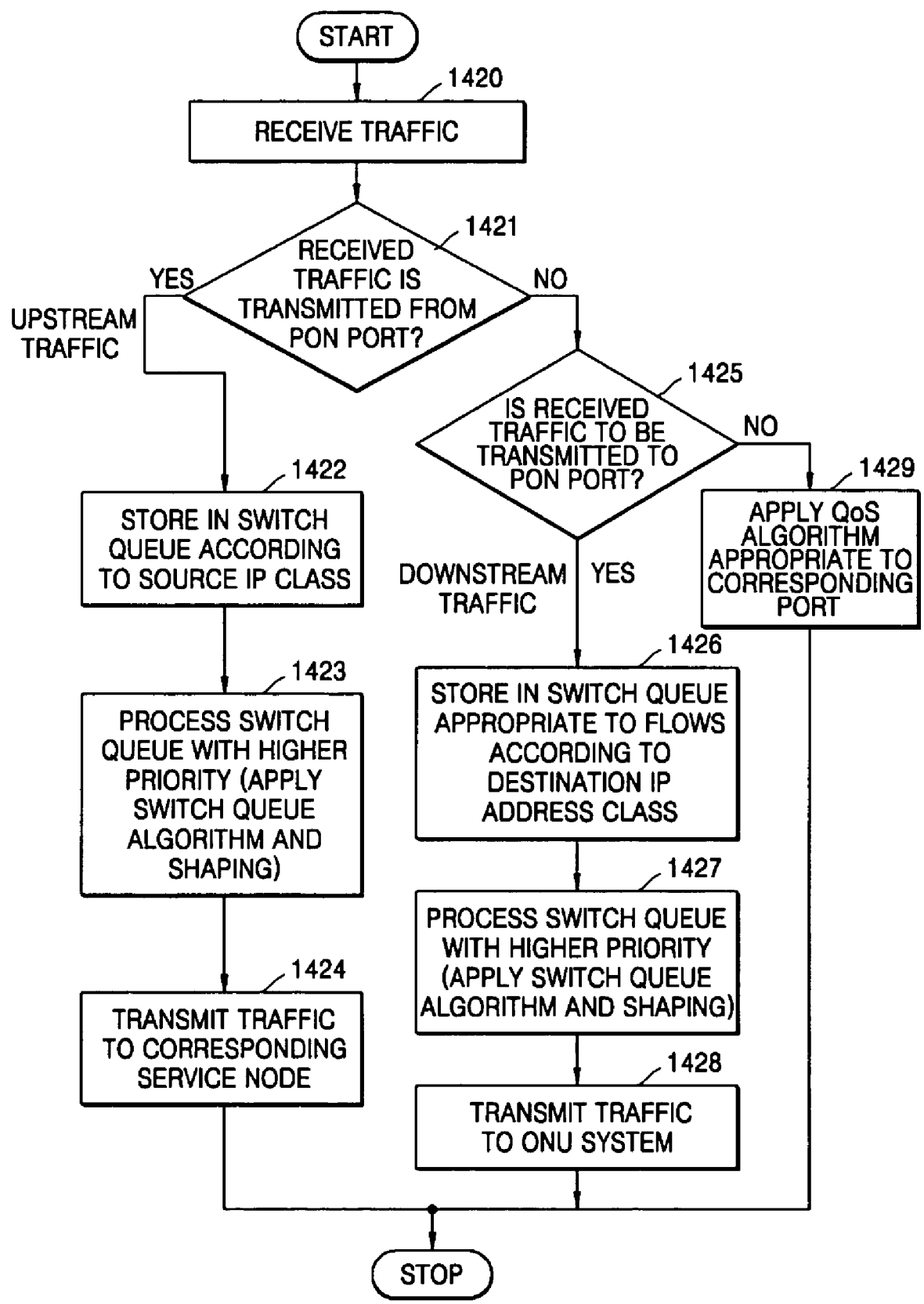

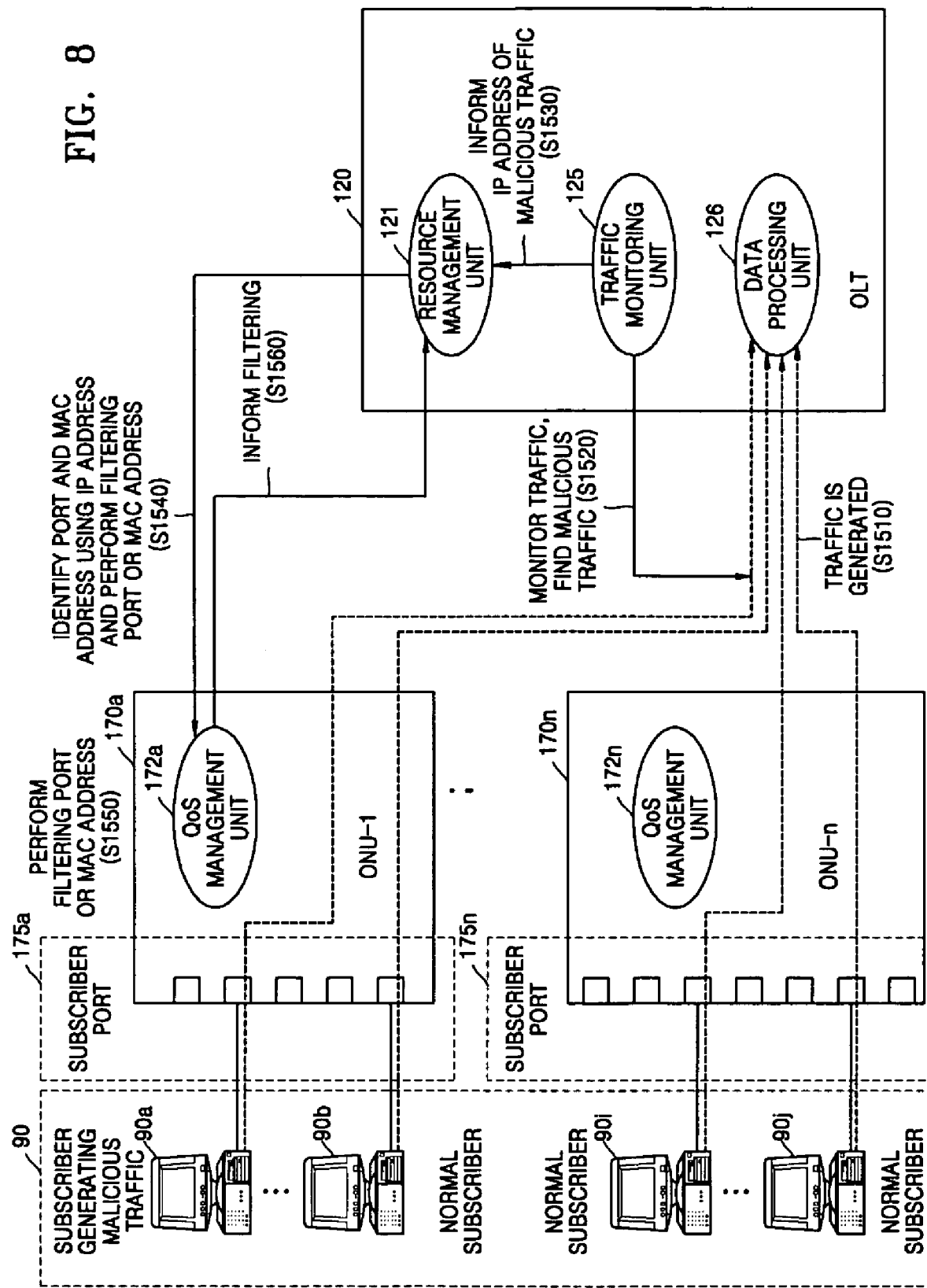

APPARATUS AND METHOD FOR SUPPORTING QUALITY OF SERVICE IN ETHERNET PASSIVE OPTICAL NETWORK SYSTEM

BACKGROUND OF THE INVENTION

This application claims the priority of Korean Patent Application No. 2003-68609, filed on Oct. 2, 2003, in the Korean Intellectual Property Office, the disclosure of which is incorporated herein in its entirety by reference.

1. Field of the Invention

The present invention relates to a method for supporting quality of service (QoS), and more particularly, to an apparatus and method for supporting QoS for respective subscriber classes for an Ethernet passive optical network (E-PON) are provided.

2. Description of the Related Art

With increasing demands for broadband multimedia including the Internet, the level of subscribers' requests for quality of service is also moving upwards. In particular, with widespread multimedia services, services requiring real-time processing and higher bandwidths are increasing and the types are also becoming more diversified. In order to support the requirements of subscribers of multimedia services, QoS (quality of service) technology has been introduced.

QoS is a performance measure indicating the quality of transmission of a transmission system and the usage degree of a service, and means a technology which specifies service classes according to the degree of guaranteeing quality of connection service requested by a subscriber, and continuously guarantees the level of quality of service enough to satisfy a subscriber in each of the specified service classes.

At present, a number of communication systems apply a variety of algorithms and provide QoS according to subscriber class. However, this kind of support of QoS according to subscriber class has a limit that the support is provided to only ports directly connected to the communication system itself. That is, when a port desired to be supported for QoS is located at a remote place as in an E-PON system, there is a problem that QoS according to subscriber class cannot be supported well enough. This is because in an E-PON, an optical line termination (OLT) system is located in a central office (CO) of a communication carrier and a plurality of optical network units (ONUs) in different remote places are connected to one OLT system such that the OLT system cannot figure out the Internet protocol (IP) address of each subscriber port of the ONU systems.

SUMMARY OF THE INVENTION

The present invention provides a method by which in an OLT system, subscriber classes for respective ports of remote ONU systems are specified and IP addresses that can be allocated to subscribers according to the specified subscriber classes are divided into predetermined ranges and managed so that quality of service (QoS) according to subscriber class can be performed in an E-PON system.

The present invention also provides a method by which malicious traffic flowing into an OLT system from a subscriber port of an ONU system is filtered in units of media access control (MAC) addresses or ports of a subscriber such that QoS according to subscriber class can be effectively performed in an E-PON system.

The present invention also provides a computer readable recording medium having embodied thereon a program for executing the methods in a computer.

According to an aspect of the present invention, there is provided an apparatus for supporting service of quality (QoS) in an Ethernet passive optical network (E-PON) including a plurality of subscriber termination systems at different remote places connected to the E-PON; and a service provider termination system which is connected to the plurality of subscriber termination systems through an optical distribution network, and allocates Internet protocol (IP) addresses according to subscriber class based on bandwidth and subscriber class information of respective ports of each of the plurality of subscriber termination systems.

According to another aspect of the present invention, there is provided a method for supporting service of quality (QoS) in an Ethernet passive optical network (E-PON) including: specifying bandwidths and subscriber classes for respective ports for a plurality of subscriber termination systems connected to a service provider termination system; based on the bandwidth information, allocating bandwidths for respective subscriber ports of the subscriber termination systems; based on the subscriber class information, assigning IP addresses to respective subscriber ports of the subscriber termination systems according to subscriber class; and by using the bandwidths and IP addresses, supporting QoS according to subscriber class in transmitting and receiving data between the service provider termination system and the subscriber termination systems.

BRIEF DESCRIPTION OF THE DRAWINGS

The above and other features and advantages of the present invention will become more apparent by describing in detail exemplary embodiments thereof with reference to the attached drawings in which:

FIG. 7 is a flowchart showing a method for processing QoS of upstream and downstream data according to subscriber class performed in an OLT system; and FIG. 8 is a diagram explaining a method for filtering malicious traffic according to a preferred embodiment of the present invention.

DETAILED DESCRIPTION OF THE INVENTION

Figure 1:
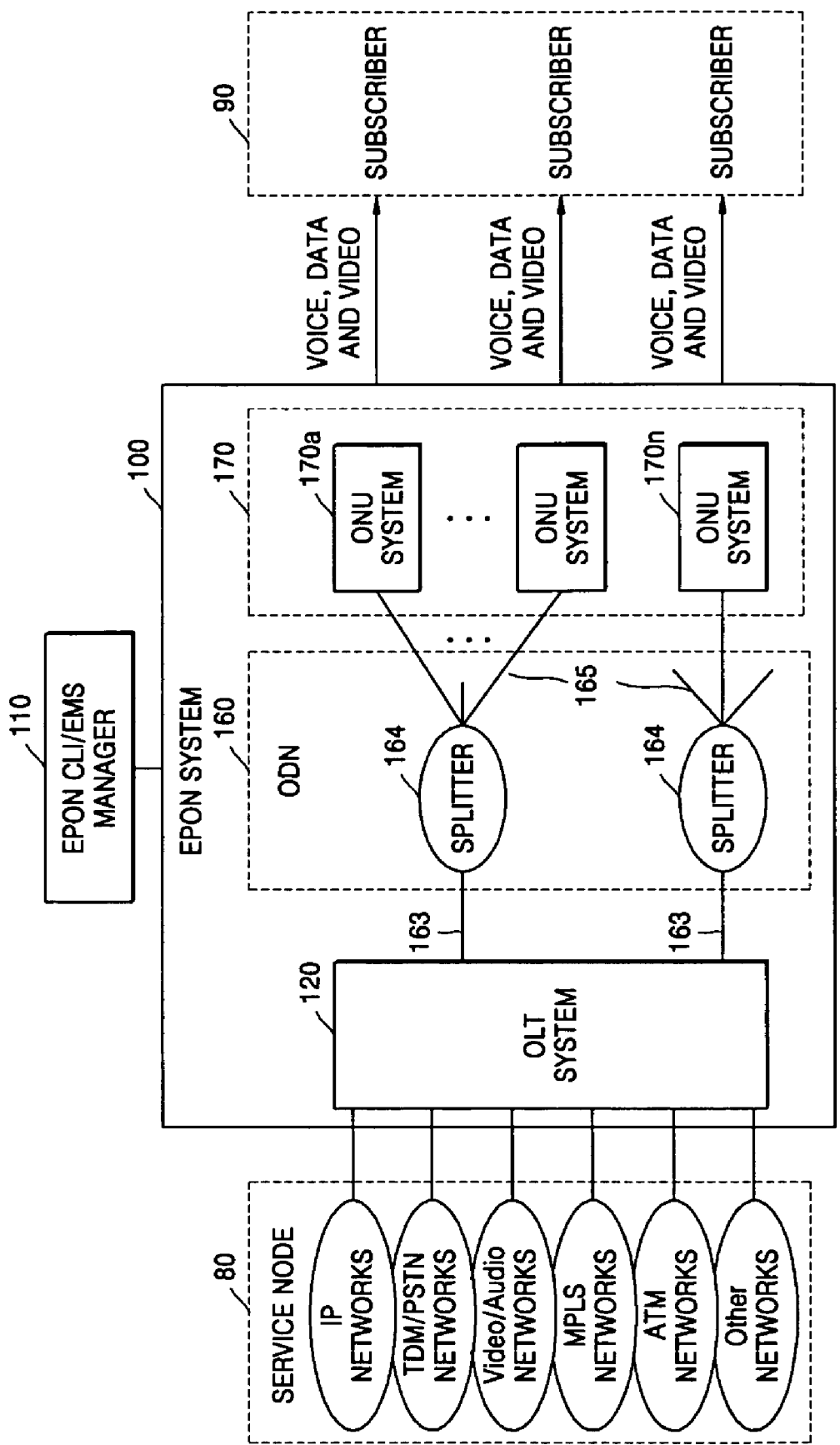
FIG. 1 is a diagram showing the structure of Ethernet passive optical network (E-PON) system according to a preferred embodiment of the present invention.

Referring to FIG. 1, an E-PON system 100 placed at the root of a tree structure comprises an OLT system 120, an optical distribution network (ODN) 160, and a plurality of ONU systems 170.

The OLT system 120 is a termination apparatus at the service provider side and converts an electric signal into an optical signal, and provides to each subscriber of the E-PON. That is, the OLT system 120 connects a variety of subscriber traffic to a service node 80 supporting IP networks, time division multiplex/public switched telephone network (TDM/PSTN) networks, video/audio networks, multiprotocol label switching (MPLS) networks, asynchronous transfer mode (ATM) networks, and a variety of networks. When traffic is thus connected, the OLT system 120 according to the present invention specifies subscriber classes of respective ports of ONU systems located at remote places, divides IP addresses that can be allocated according to the specified subscriber classes, into predetermined ranges, and manages the IP addresses. As a result, QoS according to subscriber class can be provided to the plurality of ONU systems 170a through 170n located at remote places.

The ODN 160 is connected between the OLT system 120 and the ONU systems 170 and plays a role for splitting an optical signal transmitted by the OLT system into a plurality of optical signals. For this, the ODN 160 is formed with a plurality of optical lines 163 and 165 and a plurality of passive splitters 164.

The ONU system 170 is a termination apparatus at a subscriber side connected to the OLT system 120 through the ODN 160, and performs subscriber interfacing to support data, video, and voice services, and network interfacing for upward traffic transmitted to the OLT system 120.

The entire operation and management of the E-PON system 100 having this structure is performed through an E-PON common line interface (CLI) or an element management system (EMS) manager 110 connected to the OLT system 120.

Figure 2:
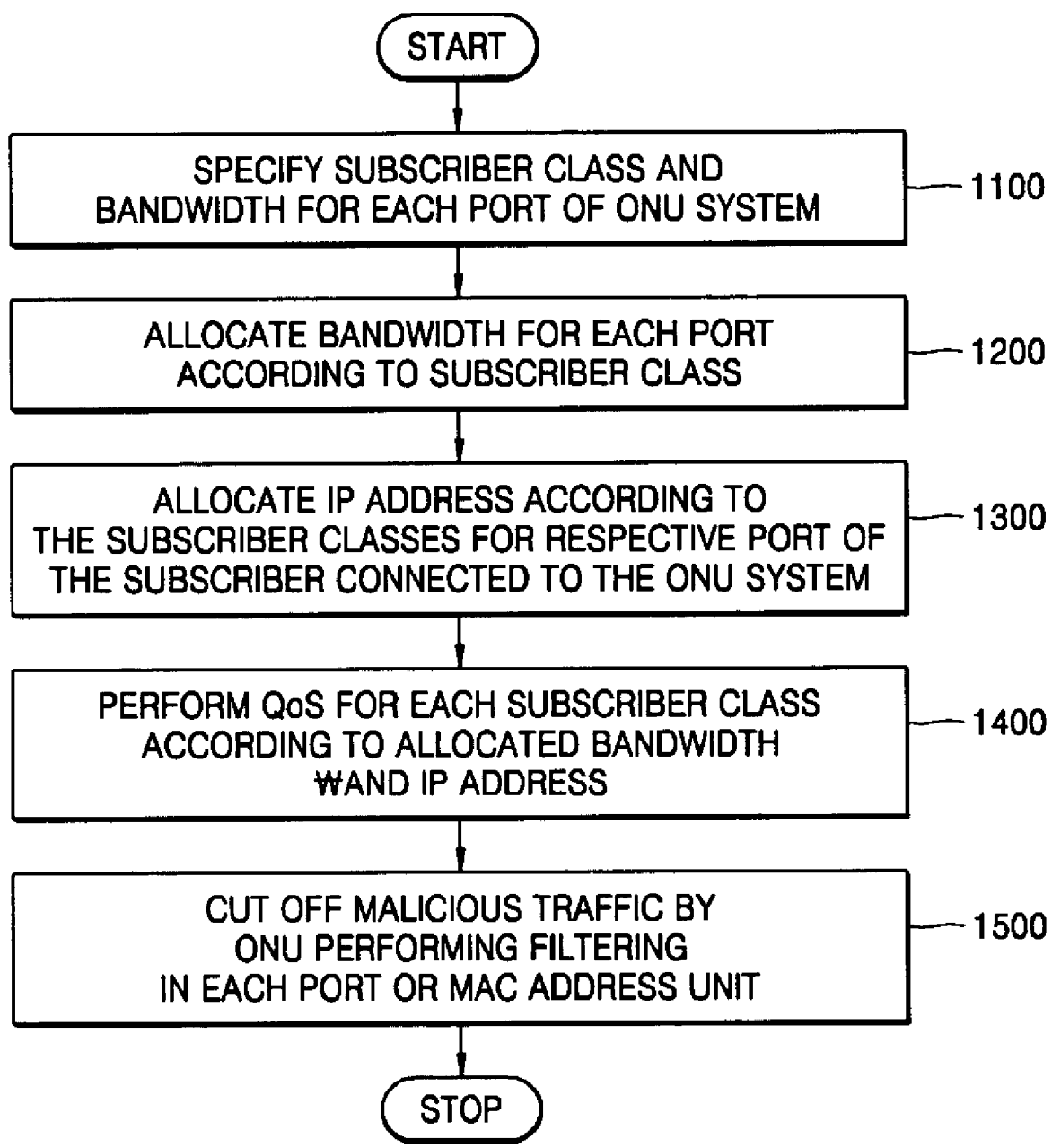
FIG. 2 is a flowchart schematically showing a method for supporting QoS according to subscriber class in an E-PON according to a preferred embodiment of the present invention.

FIG. 2 is a flowchart schematically showing a method for supporting QoS according to subscriber class in an E-PON according to a preferred embodiment of the present invention. Referring to FIG. 2, first, the OLT system 120 specifies bandwidths for respective ports for each of the ONU systems 170a through 170n by the control of the EMS manager 110, and specifies classes of respective subscribers connected to the ONU systems 170a through 170n, and then stores the data in a table and manages the data in step 1100.

Then, if any one of the plurality of ONU systems 170a through 170n is initialized and connected to the OLT system 120, the OLT system 120 allocates bandwidths to subscriber ports of the ONU system, based on information stored in the OLT system 120 in step 1200. Then, if an IP address request from a subscriber connected to the ONU system is received, the OLT system 120 allocates IP addresses corresponding to the subscriber classes to respective subscriber of the ONU system requesting the IP addresses in step 1300.

Next, by using the allocated bandwidths and IP addresses, upward and downward data transmission and reception between the OLT system 120 and each ONU system 170a through 170n connected to the OLT system 120 are performed in step 1400. As a result, QoS according to subscriber class can be performed in the E-PON system including the plurality of ONU system 170a through 170n located at different remote places.

Furthermore, by the method for supporting QoS for respective subscriber classes according to the present invention, the OLT system 120 is made to continuously monitor traffic, find out an ONU system transmitting malicious traffic of a predetermined pattern, and make the ONU system perform filtering in units of subscriber ports or MAC address units in step 1500. As a result, by efficiently cutting off the inflow of malicious traffic, providing QoS according to subscriber class for the E-PON system can be efficiently performed.

Figure 3:
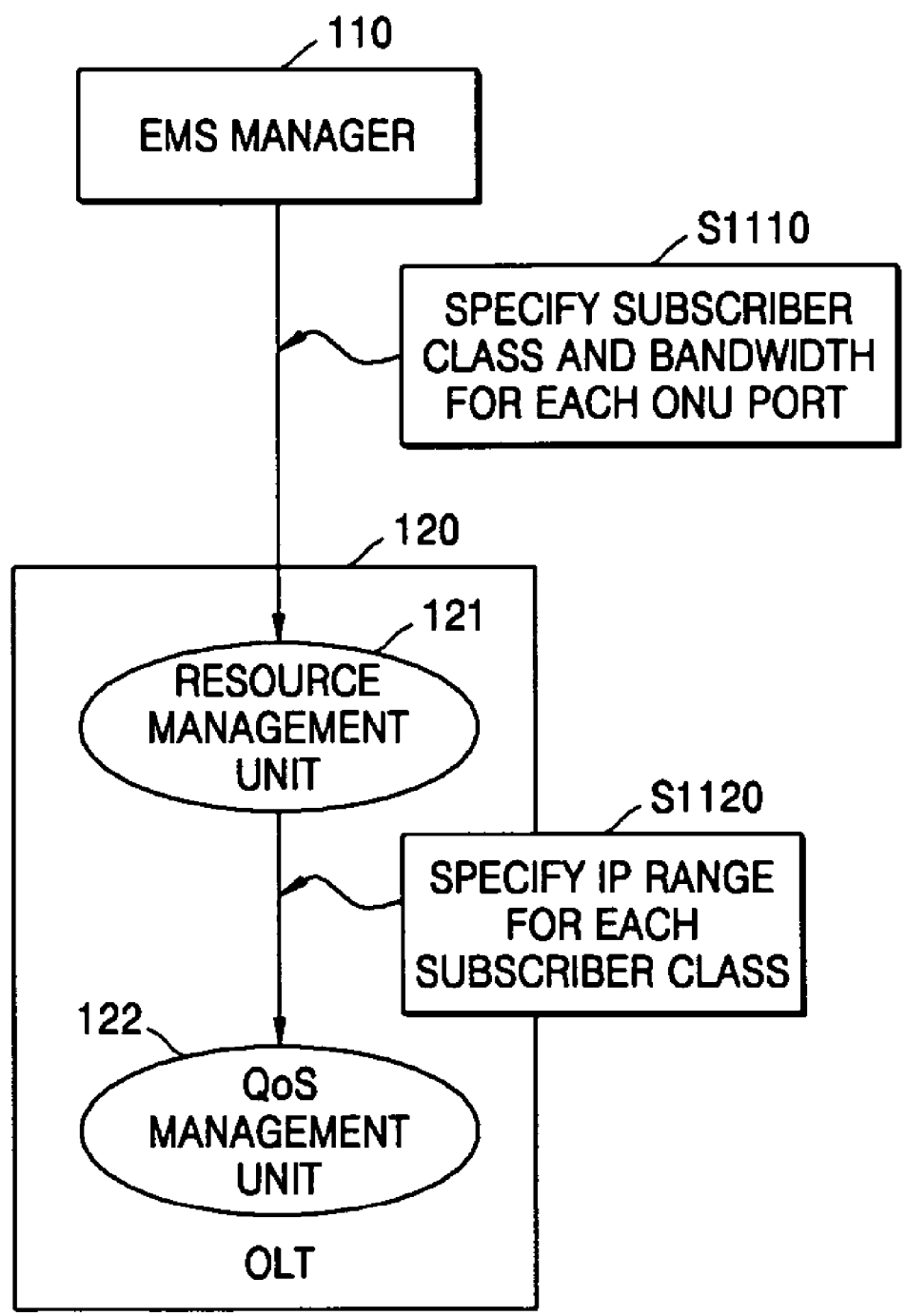
FIG. 3 is a diagram explaining functions for allocating a bandwidth for each optical network unit (ONU) port and managing classes for respective subscribers performed in an optical line termination (OLT) system according to the present invention.

FIG. 3 is a diagram explaining functions for allocating a bandwidth for each ONU port and managing classes for respective subscribers performed in an OLT system 120 according to the present invention. Referring to FIG. 3, in order to perform allocation of bandwidths for respective ONU ports and management by subscriber level, the OLT system has a resource management unit 121.

By using information set by an EMS manager 110, the resource management unit 121 specifies bandwidths and subscriber classes for respective ports of each of ONU systems 170a through 170n, and stores in the form of a table in step S1110. Then, based on the stored information on the bandwidths and subscriber classes of respective ports of the ONU systems, the resource management unit 121 specifies IP address ranges for respective subscriber classes, and transfers to the QoS management unit 122 of the OLT system 120 in step S1120. The QoS management unit 122 receives IP addresses assigned according to subscriber class, from the resource management unit 121 and provides the QoS by class, to the plurality of ONU systems 170a through 170n connected to the OLT system 120.

This management of information performed in the resource management unit 121 may vary according to an operation method of a system. For example, when a subscriber enrolls to a service, predetermined subscriber information and bandwidth information of a corresponding port may be stored in the resource management unit 121 in advance and managed, or bandwidths may be allocated arbitrarily by an E-PON CLI or an EMS manager 110 and then managed.

The process for allocating bandwidths for respective subscriber ports of an ONU and allocating IPs for respective ONU system subscriber classes performed by the OLT system 120 will now be explained.

Figure 4:
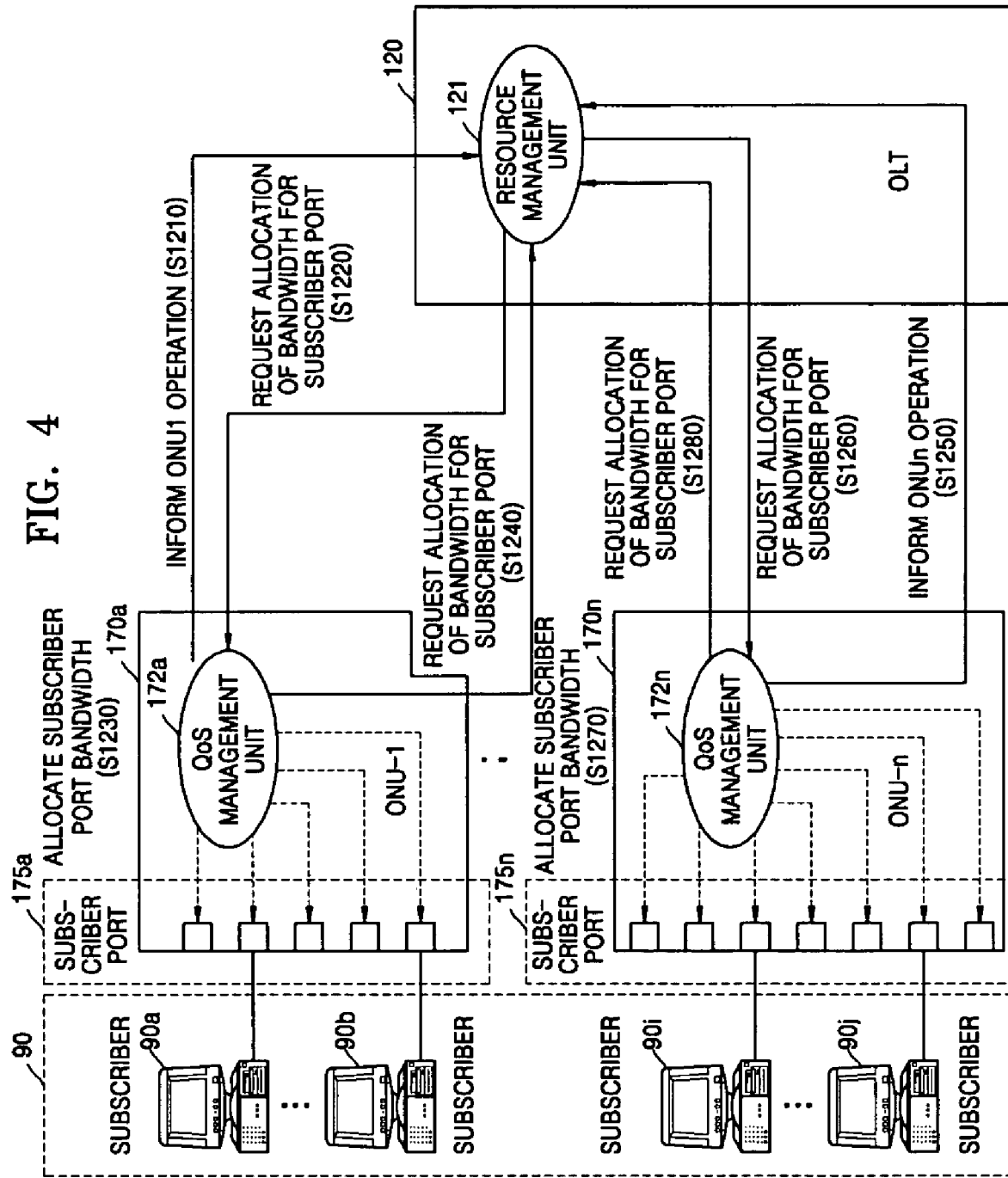
FIG. 4 is a diagram explaining a process for allocating a bandwidth for each port for ONU system subscribers according to a preferred embodiment of the present invention.

FIG. 4 is a diagram explaining the process for allocating a bandwidth for each port for ONU system subscribers according to a preferred embodiment of the present invention.

Referring to FIG. 4, first, each of ONU systems 170a through 170n, if it begins operation, transmits a driving message to the resource management unit 121 of the OLT system 120 to inform that the ONU system begins operation in steps S1210 and S1250. If driving messages from the ONU systems 170a and 170n are received, the resource management unit 121 of the OLT system 120 transmits bandwidth allocation request messages for subscriber ports, to the QoS management units 172a and 172n of the respective ONU systems 170a and 170n transmitting the driving message in step S1220 and S1260. At this time, the bandwidth allocation request message transmitted by the resource management unit 121 contains bandwidth information on a corresponding port.

The QoS management units 172a and 172n of the ONU systems 170a and 170n receiving the bandwidth allocation request messages from the resource management unit 121 of the OLT system 120 perform bandwidth allocation for corresponding subscriber ports 175a and 175n in response to the bandwidth information on subscriber ports contained in the bandwidth allocation request messages in steps S1230 and S1270. Then, the QoS management units 172a and 172n inform the resource management unit 121 of the OLT system 120 that bandwidths of subscriber ports are allocated in steps S1240 and S1280.

Figure 5:
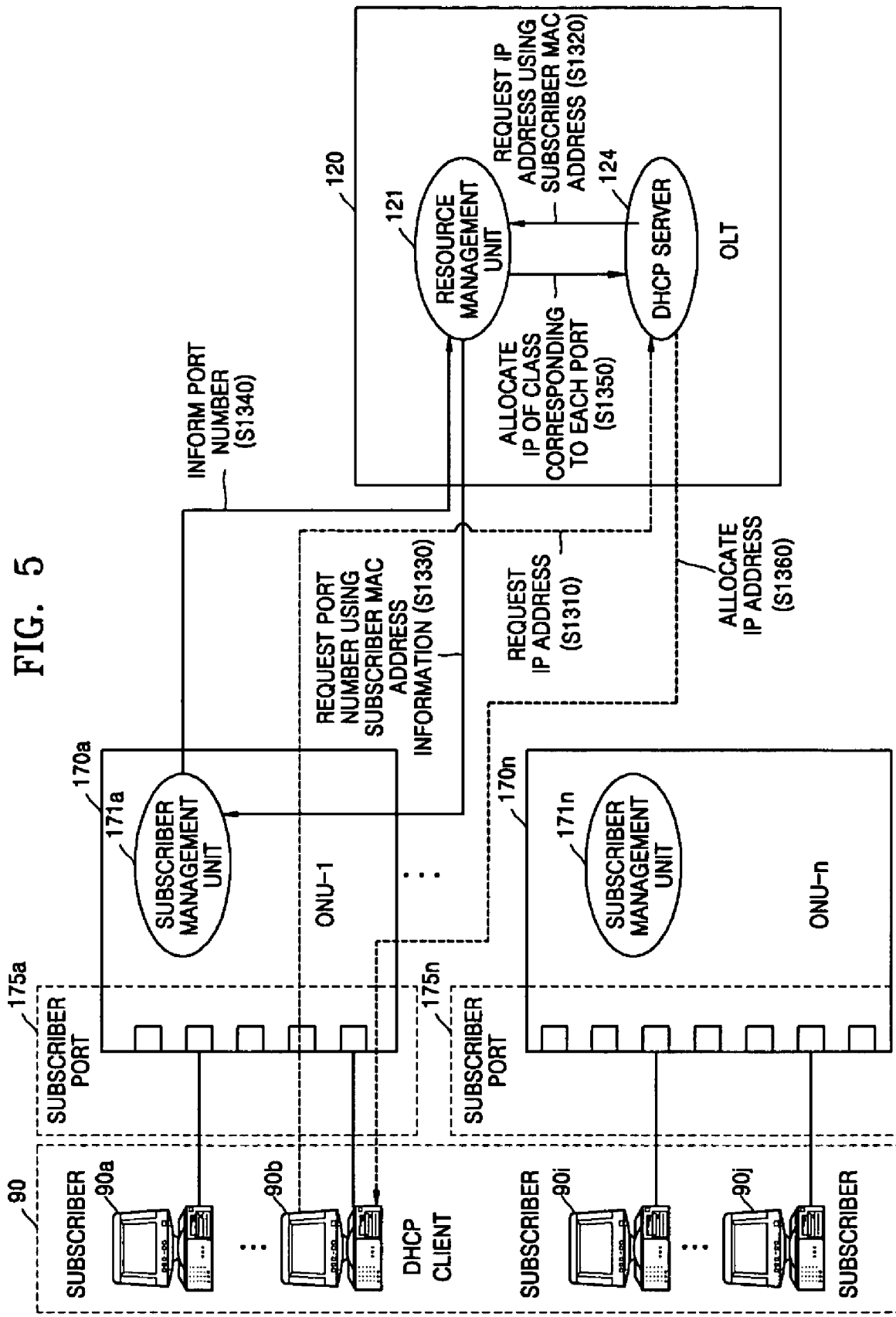
FIG. 5 is a diagram explaining a process for allocating an IP for each class for ONU system subscribers according to a preferred embodiment of the present invention.

FIG. 5 is a diagram explaining a process for allocating an IP for each class for ONU system subscribers according to a preferred embodiment of the present invention.

Referring to FIG. 5, first, if a subscriber (for example, a dynamic host configuration protocol (DHCP) client) 90b connected to the subscriber port 175a of the ONU system 170a begins operation, the corresponding subscriber 90b generates a message requesting an IP address of the subscriber 90b to the OLT system 120, by using the DHCP protocol in step S1310. The P address request message generated by the ONU system 170a is transferred to the DHCP server 124 disposed in the OLT system 120. By using the MAC address of the subscriber, the DHCP server 124 receiving the message generates a message requesting an IP address of the subscriber, to the resource management unit 121 of the OLT system 120 in step S1320.

In order to allocate an IP address appropriate to the class of the subscriber 90b, the resource management unit 121 should know port information of the ONU system 170a to which the subscriber 90b is connected (that is, the number of port to which the subscriber is connected). For this, the resource management unit 121 provides subscriber's MAC address information to the subscriber management unit 171a of the ONU system 170a, and requests the corresponding port number of the subscriber 90b in step S1330.

In the subscriber management unit 171a of the ONU system 170a, MAC address and port information of subscribers is stored and managed in the form of a table. If the resource management unit 121 requests the port number, the subscriber management unit 171a of the ONU system 170a retrieves and extracts the port number corresponding to the MAC address of the subscriber input from the resource management unit 121. Then, the extracted subscriber port number is transmitted to the resource management unit in step S1340.

By using information on bandwidths allocated to respective ports of ONU systems and information on subscriber classes for respective ports stored and managed in the form of a table in the resource management unit 121, the resource management unit 121 dynamically allocates an IP address corresponding to the port number transmitted by the subscriber management unit 171a (that is, an IP address appropriate to the class of the subscriber port), and informs the IP address to the DHCP server 124 in step S1350. Then, the DHCP server 124 transfers the IP address allocated by the resource management unit 121 to the corresponding subscriber 90b in step S1360.

As described above, whenever the ONU systems 170a and 170n begin operations, the OLT system 120 allocates bandwidths for respective subscriber ports 175a and 175n of the ONU systems 170a and 170n, and IP addresses for respective subscriber classes. Accordingly, QoS differentiated according to subscriber class can be supported for each of subscribers connected to the ONU systems 170a and 170n.

Figure 6:
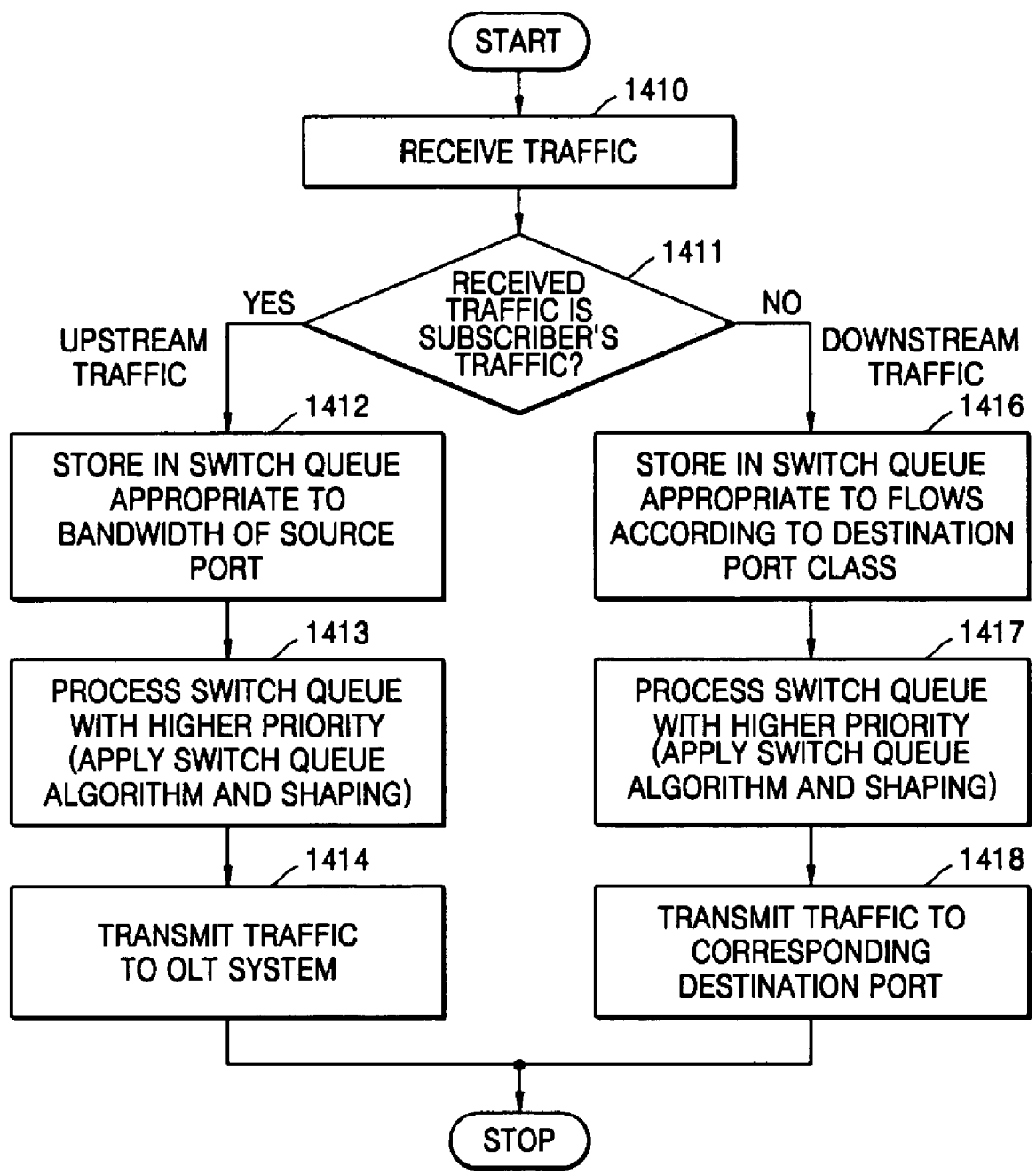
FIG. 6 is a flowchart showing a method for processing QoS of upstream and downstream data according to subscriber class performed in an ONU system.

FIGS. 6 and 7 are detailed flowcharts of the step 1400 shown in FIG. 2. FIG. 6 shows a method for processing QoS of upstream and downstream data according to subscriber class performed in the ONU systems 170 and FIG. 7 shows a method for processing QoS of upstream and downstream data according to subscriber class performed in the OLT system 120.

Referring to FIG. 6, each of the ONU systems 170 processes traffic, including upward traffic transmitted to the OLT system 120, and downward traffic transmitted by the OLT system 120, by setting priorities according to flows of ports. A detailed operation for this will now be explained.

First, if the ONU system 170 receives traffic in step 1410, the ONU system 170 determines whether the receive traffic is flowing in from a subscriber port 175 (upward traffic), or from the OLT system 120 (downward traffic) in step 1411.

If the determination result in the step 1411 indicates that the received traffic is flowing in from the subscriber port 175 (that is, the received traffic is upward traffic), the traffic is stored in a switch queue corresponding to the bandwidth of a source port corresponding to the traffic in step 1412. In this case, since the port bandwidth of the ONU system 170 has been set already by the process shown in FIG. 4, the received traffic can be stored in the queue appropriate to the bandwidth of the source port from which the traffic is flowing in. Then, by applying a switching queue algorithm and shaping, the ONU system 170 processes traffic data in a queue having a higher priority in step 1413, and transmits the processed traffic to the OLT system 120 in step 1414.

If the determination result in the step 1411 indicates that the received traffic is flowing in from the OLT system 120 (that is, the received traffic is downward traffic), the traffic is stored in a switch queue corresponding to the traffic based on the flows of traffic according to the class of the traffic destination port in step 1416. In this case, since the port bandwidth of the ONU system 170 has been set already by the process shown in FIG. 4, the received traffic can be stored in the queue appropriate to the bandwidth of the destination port of the traffic. Then, by applying a switching queue algorithm and shaping, the ONU system 170 processes traffic data in a queue having a higher priority in step 1417, and transmits the processed traffic to the corresponding destination subscriber port in step 1418.

Next, referring to FIG. 7, the OLT system 120 processes downward traffic transmitted to the ONU system 170 and upward traffic received from the ONU system 170 by setting priorities according to flows of IP addresses. A detailed operation for this will now be explained.

First, if the OLT system receives traffic in step 1420, the OLT system determines whether or not the received traffic is transmitted by a PON port connected to the ONU system 170 in step 1421.

If the determination result of the step 1421 indicates that the received traffic is transmitted by a PON port connected to the ONU system 170 (that is, the received traffic is upward traffic), the OLT system classifies the received traffic according to source IP and stores in an appropriate switch queue in step 1422. In this case, since the IP address of a subscriber is determined by the class of a subscriber port by the method shown in FIG. 5, the OLT system 120 can determine the class of the traffic, by referring to the source IP address of the traffic transmitted by the ONU system 170. Then, by applying a switching queue algorithm and shaping, the OLT system 120 processes traffic data in a queue having a higher priority in step 1423 and transmits the processed traffic to the corresponding service node in step 1424.

If the determination result of the step 1421 indicates that the received traffic is not transmitted by a PON port connected to the ONU system 170, then the OLT system 120 determines whether or not the received traffic is traffic that should be transmitted to the ONU system 170 in step 1425.

If the determination result of the step 1425 indicates that the received traffic should be transferred to the ONU system 170 (that is, the received traffic is downward traffic), the OLT system stores the traffic in a switch queue appropriate to the class of the destination IP address of the received traffic in step 1426. Here, since the IP address of a subscriber is determined by the class of a subscriber port by the method shown in FIG. 5, the OLT system 120 can determine the class of the traffic, by referring to the source IP address of the traffic transmitted by the ONU system 170. Then, by applying a switching queue algorithm and shaping, the OLT system 120 processes traffic data in a queue having a higher priority in step 1427 and transmits the processed traffic to the ONU system 170 in step 1428.

If the determination result of the step 1425 indicates that the received traffic is not the traffic that should be transferred to the ONU system 170 (that is, the received traffic is not downward traffic transmitted to the ONU system), by applying a QoS algorithm appropriate to the port corresponding to the traffic, the OLT system 120 support QoS service in step 1429.

Next, a process for filtering malicious traffic flowing into the OLT system from a subscriber port of the ONU system in order to provide more efficient QoS will now be explained.

FIG. 8 is a diagram explaining a method for filtering malicious traffic according to a preferred embodiment of the present invention, and shows a process for filtering malicious traffic flowing into the OLT system from a subscriber port of an ONU system on an E-PON.

Referring to FIG. 8, the OLT system 120 according to the present invention has a traffic monitoring unit 125 to perform filtering malicious traffic. When the OLT system 120 processes data, the traffic monitoring unit 125 monitors traffic and informs the resource management unit 121 of the OLT system 120 which subscriber transmits malicious traffic. By doing so, the traffic monitoring unit 125 enables the OLT system 120 to allow the ONU system generating malicious traffic to perform filtering in units of ports or MAC addresses of subscribers. The process for filtering malicious traffic according to the present invention will now be explained.

First, if subscribers 90a through 90j connected to subscriber ports 175a and 175n of ONU systems 170a and 170n transmit traffic to the OLT system in step S1510, the OLT system 120 processes the data transmitted through a data processing block 126.

When the data is processed, the traffic monitoring unit 125 of the OLT system 120 continuously monitors traffic flowing in from the subscriber ports 175a and 175n of the ONU systems 170a and 170n, to the OLT system 120.

If a predetermined pattern of malicious traffic generated from a subscriber 90a is sensed during the monitoring in step S1520, the traffic monitoring unit 125 informs the resource management unit 121 of the OLT system 120 of the IP address of the subscriber generating the malicious traffic in step S1530.

As described above, in the present invention, the IP address and MAC address of each subscriber of the ONU systems and the port number of the ONU system can be learned according to the method shown in FIG. 5.

Accordingly, by using the IP address input from the traffic monitoring unit 125, the resource management unit 121 can find out the MAC address of the corresponding subscriber and the port number of the ONU system. Then, whether the malicious traffic is filtered in units of MAC addresses or port units of the ONU system is determined according to the filtering mechanism of the resource management unit 121 and a filtering request message is transmitted to the ONU system 170a generating the malicious traffic in step S1540.

The QoS management unit 172 of the ONU system receiving the filtering request message transmitted by the resource management unit 121 of the OLT system 120 (that is, the QoS management unit of the ONU system generating the malicious traffic) sets a filtering function in units of MAC addresses or ports according to a filtering method specified by the filtering request message in step S1550. Then, the QoS management unit informs the resource management unit 121 that the filtering function is set, and performs filtering according to the set filtering method in step S1560. As a result, when a predetermined pattern of malicious traffic or traffic exceeding a predetermined bandwidth occurs, the inflow of traffic generated in the corresponding port or MAC address of the ONU system generating the traffic is automatically cut off. Accordingly, in the present invention, without installing a separate traffic monitoring function in each of the ONU systems 170a through 170n, malicious traffic or traffic exceeding a predetermined bandwidth is cut off by the OLT system 120 such that more efficient QoS can be provided.

The invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An apparatus for supporting service of quality (QoS) in an Ethernet passive optical network (E-PON) comprising:

a plurality of subscriber termination systems at different remote places connected to the E-PON, each of the subscriber termination systems to store a mapping between a media access control (MAC) address and a corresponding port number of respective subscriber termination systems; and a service provider termination system which is connected to the plurality of subscriber termination systems through an optical distribution network, and allocates Internet protocol (IP) addresses according to subscriber classes based on bandwidth and subscriber class information of respective ports of each of the plurality of subscriber termination systems, wherein the service provider termination system maps the bandwidth and subscriber class information to the corresponding port number, the service provider termination system to obtain the corresponding port number of a request for an IP address by sending the MAC address in the request to the subscriber termination systems.

2. The apparatus of claim 1, wherein the service provider termination system comprises:

a resource management unit which stores the bandwidth and subscriber class information of the respective ports of each of the plurality of subscriber termination systems, and based on the bandwidth and subscriber class information of the respective ports, allocates the IP addresses according to classes of subscribers connected to the subscriber termination systems; and a service quality management unit which supports QoS according to the subscriber classes for the subscriber termination systems by using the bandwidths and the IP addresses.

3. The apparatus of claim 1, wherein the bandwidth and subscriber class information of the respective ports is specified by any one of an E-PON common line interface (CLI) that performs the entire operation management of the E-PON, and an element management system (EMS) manager.

4. The apparatus of claim 1, wherein the bandwidth and subscriber class information of the respective ports is set when the subscribers enroll and is stored in the service provider termination system.

5. The apparatus of claim 1, wherein each of the subscriber termination systems processes upward traffic transmitted to the service provider termination system and downward traffic transmitted from the service provider termination system according to priorities of flows of ports.

6. The apparatus of claim 1, wherein downward traffic transmitted to the subscriber termination systems and upward traffic received by the subscriber termination systems processed according to the priorities of flows of the IP addresses.

7. The apparatus of claim 1, wherein the service provider termination system further comprises:
a traffic monitoring unit which monitors traffic flowing in from the plurality of subscriber termination systems, and when malicious traffic flows in, transfers the IP address of a subscriber who generates the malicious traffic, to the resource management unit.

8. The apparatus of claim 7, wherein the resource management unit in response to the IP address transmitted by the traffic monitoring unit, finds out the port number and MAC address of the subscriber who generates the malicious traffic, and cuts off traffic flowing in from the subscriber corresponding to the port number and MAC address of the subscriber.

9. The apparatus of claim 7, wherein the resource management unit performs traffic filtering in units of any one of the port number and media access control (MAC) address of the subscriber.

10. A method for supporting service of quality (QoS) in an Ethernet passive optical network (E-PON) comprising:
specifying, at a service provider termination system, bandwidths and subscriber classes for respective ports for a plurality of subscriber termination systems connected to the service provider termination system;
storing, at each of the subscriber termination systems, a mapping between a media access control (MAC) address and a corresponding port number of respective subscriber termination systems;
based on bandwidth information transmitted from the service provider termination system, allocating, at each of the subscriber termination systems, the bandwidths for the respective ports of the subscriber termination systems;
sending, from the service provider termination system, the MAC address in a request for an IP address to the subscriber termination systems to obtain the corresponding port number;
mapping, at the service provider termination system, the corresponding port number to subscriber class;
based on the subscriber classes, assigning, at the service provider termination system, IP addresses to respective subscribers of the subscriber termination systems; and
by using the bandwidths and the IP addresses, supporting QoS according to the subscriber classes in transmitting and receiving data between the service provider termination system and the subscriber termination systems.

11. The method of claim 10, further comprising:
by monitoring traffic flowing in from the subscriber termination systems, cutting off inflow of malicious traffic.

12. The method of claim 11, wherein cutting off inflow of malicious traffic comprises:
monitoring traffic flowing in from the subscriber termination system to the service provider termination system;
if the monitoring result indicates inflow of malicious traffic, by using the IP address of a subscriber generating the malicious traffic, finding out the MAC address and port number of the subscriber; and
in response to the MAC address and port number, filtering malicious traffic of the subscriber termination system to which the subscriber is connected.

13. The method of claim 12, wherein the traffic filtering is performed in any one MAC address units and port units of the subscriber.

14. The method of claim 10, wherein specifying the bandwidths and subscriber classes comprises:
specifying the bandwidths and the subscriber classes for respective ports in each of the subscriber termination systems; and
storing information on the bandwidths and the subscriber classes for the respective ports in the service provider termination system.

15. The method of claim 10, wherein information on the bandwidths and the subscriber classes of the respective ports is set when subscribers enroll and is stored in the service provider termination system.

16. The method of claim 10, wherein information on the bandwidths and the subscriber classes of respective ports is specified by any one of an E-PON CLI that performs the entire operation management of the E-PON, and an EMS manager.

17. The method of claim 10, wherein allocating the bandwidths comprises:
transmitting a driving message to the service provider termination system when one of the subscriber termination systems is driven;
the service provider termination system providing information on the bandwidths for the respective ports to each of the subscriber termination systems that transmitted the driving message; and
in response to the information, each of the subscriber termination systems allocating bandwidths for the respective ports.

18. The method of claim 10, wherein assigning the IP addresses comprises:
when a subscriber connected to one of the subscriber termination systems is driven, the subscriber requesting the IP address of the subscriber to the service provider termination system;
the service provider termination system transmitting media access control (MAC) address information of the subscriber to the subscriber termination system to which the subscriber requesting the IP address is connected, and requesting the port number of the subscriber corresponding to the MAC address;
the subscriber termination system retrieving the port number corresponding to the MAC address of the subscriber, and transmitting to the service provider termination system; and
by using information on the bandwidths and the subscriber classes for respective ports stored in the service provider termination system, assigning the IP address corresponding to the information of the subscriber classes and transferring the assigned IP address to the corresponding subscriber.

19. The method of claim 10, wherein supporting the QoS comprises:
processing upward traffic transmitted from the subscriber termination systems to the service provider termination system and downward traffic transmitted from the service provider termination system to the subscriber termination systems according to priorities of flows of ports; and processing downward traffic transmitted to the subscriber termination systems and upward traffic received by the subscriber termination systems according to the priorities of flows of the IP addresses.

20. The method of claim 19, wherein processing the traffic according to priorities of flows of ports comprises:
- determining whether the traffic received by the subscriber termination systems is upward traffic flowing in from a subscriber port, or downward traffic flowing in from the service provider termination system;
- if the determination result indicates that the traffic is upward traffic, storing the traffic in a switch queue corresponding to the bandwidth of the source port of the traffic;
- by applying a switching queue algorithm and shaping, processing the traffic of a queue having a higher priority and transmitting to the service provider termination system;
- if the determination result indicates that the traffic is downward traffic, storing the traffic in a switch queue according to flows of traffic based on the class of the destination port corresponding to the traffic; and
- by applying a switching queue algorithm and shaping, processing the traffic of a queue having a higher priority and transmitting to the destination subscriber port corresponding to the traffic.

21. The method of claim 19, wherein processing the traffic according to the priorities of flows of IP addresses comprises:
- determining whether the traffic received by the service provider termination system is upward traffic flowing in from the subscriber termination system or downward traffic to be transmitted to the subscriber termination system;
- if the determination result indicates that the traffic is upward traffic, classifying the traffic according to IP addresses and storing in switch queues with appropriate priorities;
- by applying a switching queue algorithm and shaping, processing traffic in a queue with a higher priority and transmitting to a service node corresponding to the traffic;
- if the determination result indicates that the traffic is downward traffic, storing the traffic in a switch queue according to the flows of traffic based on the class of the destination IP address; and
- by applying a switching queue algorithm and shaping, processing traffic in a queue with a higher priority and transmitting to the subscriber termination system corresponding to the traffic.

22. The method of claim 21, wherein processing the traffic according to the priorities of flows of TP addresses further comprises:
- if the determination result indicates that the traffic is neither upward traffic nor downward traffic, applying a QoS supporting algorithm appropriate to the port of the traffic.

* * * * *